(12) United States Patent
Healy

(10) Patent No.: US 6,745,985 B2
(45) Date of Patent: Jun. 8, 2004

(54) HOSE SLING FOR IRRIGATION SYSTEM

(75) Inventor: Mark Healy, Orlando, FL (US)

(73) Assignee: Senninger Irrigation Inc., Orlando, FL (US)

( * ) Notice: Subject to any disclaimer, the term of this patent is extended or adjusted under 35 U.S.C. 154(b) by 10 days.

(21) Appl. No.: 10/270,897

(22) Filed: Oct. 15, 2002

(65) Prior Publication Data

US 2004/0069912 A1 Apr. 15, 2004

(51) Int. Cl.[7] .............................................. A62C 13/76
(52) U.S. Cl. .................................... 248/75; 248/229.16
(58) Field of Search ........................ 248/75, 74.2, 77, 248/78, 79, 229.16; 4/615; 239/722, 723, 726, 727, 728, 729, 740, 246, 450; 138/110; 285/5, 336, 364; 348/921, 229.2, 316.7; 403/188, 391, 397, 400, 237, 209, 213; 24/543, 545, 297, 460, 462

(56) References Cited

U.S. PATENT DOCUMENTS

| | | | |
|---|---|---|---|
| 1,397,453 A | * | 11/1921 | Rekar |
| 1,601,612 A | | 9/1926 | Edwards |
| 2,523,785 A | * | 9/1950 | Sereno |
| 2,942,314 A | | 6/1960 | Debner et al. |
| 3,404,410 A | * | 10/1968 | Sumida |
| 3,905,070 A | * | 9/1975 | Macrae .................... 24/81 CR |
| 4,550,891 A | | 11/1985 | Schaty |
| 4,861,081 A | | 8/1989 | Satoh |
| 5,024,405 A | | 6/1991 | McGuire |
| D323,614 S | * | 2/1992 | Bell ............................ D8/373 |
| 5,172,878 A | | 12/1992 | Lederman |
| 5,351,920 A | | 10/1994 | Decky et al. |
| 5,358,423 A | * | 10/1994 | Burkhard .................... 439/402 |
| 5,584,212 A | * | 12/1996 | Wild ......................... 74/502.6 |
| 5,960,827 A | * | 10/1999 | Rosenberg ................. 137/561 |

* cited by examiner

Primary Examiner—Gwendolyn Baxter
(74) Attorney, Agent, or Firm—William M. Hobby, III

(57) ABSTRACT

A wheeled line irrigation system has a water main supported on a plurality of towers and has a truss built of truss rods attached to the water main to support a plurality of drop hoses connected to the water main over the trusses for distribution of irrigation water from an irrigation system to the crops below. A truss rod hose sling is attached to a truss rod and to a hose for holding the hose to the truss rod to guide the hose over the truss rod.

3 Claims, 3 Drawing Sheets

HOSE SLING FOR IRRIGATION SYSTEM

BACKGROUND OF THE INVENTION

The present invention relates to hose slings and especially to a hose sling for holding a hose to rod.

Wheeled line irrigation systems are commonly used throughout the United States for irrigating agricultural lands. Generally, the wheeled line irrigation systems include a plurality of wheeled towers supporting a linear water conduit in a manner, that the wheeled towers and water conduit can be moved through an agricultural field for changing the position of irrigation sprinklers coupled to the water conduit. One end of the water conduit is coupled to a water main or well and sprinkler heads are mounted in spaced alignment along the water conduit between the wheeled towers. The irrigation system may be moved in an agricultural field by a motor coupled through a gear box to the wheels of the towers.

One type of wheeled line irrigation system in common use is a center pivot irrigation system used in the irrigation of large fields. These typically are comprised of a linear water conduit which is pivotally connected at one end to a source of water under pressure. The water conduit is carried in an elevated position by a plurality of spaced wheeled towers which are powered by hydraulic, pneumatic or electric motors to rotatably sweep the central conduit over a central pattern in a field. The central conduit includes a plurality of water sprinkling heads spaced over its length for distributing a spray of water on the circular field area as the center pivot irrigation conduit passes thereby. The center pivot and other wheeled line irrigation systems have been successful for uniform distribution of water over a field crop.

The current practice in some irrigation systems is to connect the drop hoses to the water main with conventional couplings and then have the hoses extend out over a horizontal truss rod where they drop near the field below and may have sprinkler nozzles attached to the end thereof for distributing the water adjacent the crops.

The present invention is directed towards the attachment of drop hoses to the water main of a wheeled irrigation system having a truss system attached to the water main for supporting the hoses thereover to securely hold the hose in place. A truss rod hose sling is adapted to snap onto a hose and then to snap onto a truss rod which then locks the hose within the truss rod sling hose clamp.

It has been common in the past to provide various types of pipe, hose, reel or wire support attached to other elongated members, such as rods or pipes. Once such prior U.S. patent can be seen in the Deckey et al. patent, U.S. Pat. No. 5,351,920, for a pipe support which is a tubular conduit support for supporting pipes from a threaded rod and has a pair of z-shaped threaded clips for mounting the support on the threaded rod and a U-shaped clamp on the other side of the base member for supporting the pipe. In the Schaty U.S. Pat. No. 4,550,891, a one piece plastic pipe clip has one or more pipe receiving portions, one wall of which is provided with a rockable element which overlies a stud-receiving hole in the clip body so that the element will close over a pipe and secure it when the clip is assembled on a projecting stud. The S. A. Debner et al. U.S. Pat. No. 2,942,314 shows a double-ended cord holder while the Lederman U.S. Pat. No. 5,172,878 shows a motion transmitting remote control assembly with improved retainers. The McGuire U.S. Pat. No. 5,024,405 shows a pipe clamp having a pipe gripper affixed to a base and in which the base may selectively engage a support bar. The C. Edwards U.S. Pat. No. 1,601,612, is for a rope clamp for fenceposts.

In contrast, the present invention is for clamping a hose in a wheeled line irrigation system from a water main over a hose supporting truss in a manner to hold the hose in place in a drop irrigation system. The truss rod hose sling, advantageously, can clip onto a hose from the side of the hose and then be clamped onto a truss rod in the irrigation system to lock the hose clamp closed over the hose.

SUMMARY OF THE INVENTION

A wheeled line irrigation system has a water main supported on a plurality of towers and has a truss built of truss rods attached to the water main to support a plurality of drop hoses connected to the water main over the trusses for distribution of irrigation water from an irrigation system to the crops below. The improvement includes a truss rod hose sling having a body having a hose supporting clamp portion for clamping onto a hose. The hose supporting clamp portion has an axial opening for holding a hose in an expandable side opening for sliding a hose into the axial opening. The truss rod hose sling body has a pair of truss rod clamps for clamping the truss rod hose sling to a truss rod. Each truss rod clamp is generally perpendicular to the axial opening in the hose supporting clamp portion and is on an opposite side of the hose supporting clamp portion expandable side opening to prevent the side opening from expanding when the truss rod clamps are clamped to a truss rod. This holds the hose in the hose supporting clamp portion. The irrigation system. also includes a coupling for the water main which allows the drop hoses to be attached at an angle from the water main and which can have a separate turn off valve for each of the hose couplings.

BRIEF DESCRIPTION OF THE DRAWINGS

Other objects, features, and advantages of the present invention will be apparent from the written description and the drawings in which.

DESCRIPTION OF THE PREFERRED EMBODIMENTS

Figure 1:
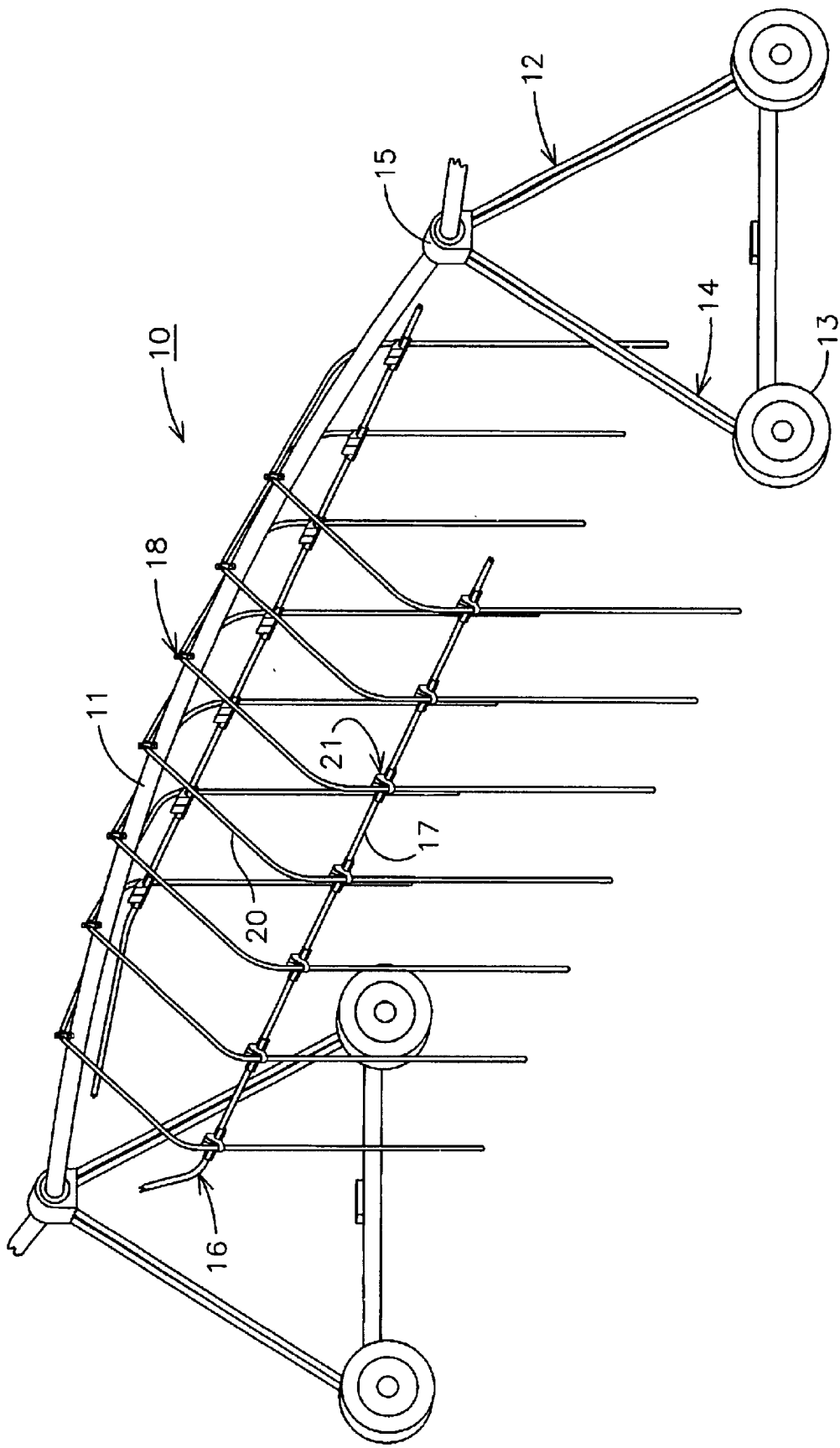
FIG. 1 is a perspective view of a section of a wheeled line irrigation system incorporating the present invention.

Referring to the drawings and especially to FIG. 1, a portion of a wheeled line irrigation system 10 has a water main or conduit 11 supported on a plurality of wheeled towers 12. Each wheeled tower has a pair of wheels 13 supporting a generally triangular framework 14 having a water main support coupling 15. The irrigation system 11 has a truss system 16 attached thereto which includes horizontally extending truss rods 17 mounted on either side and away from the water main 11. A plurality of water main connections 18 attach to the water main 11 for attaching a plurality of hoses 20. Each of the flexible hoses 20 is connected to the water main connector 18 and allowed to extend over the truss rod 17 and drop down to a position adjacent crops located in a field that is being irrigated. The use of a plurality of drop hoses 20 over the truss rod 17 is to provide a better distribution of the water to the fields from the hoses 20. Each of the hoses 20 can have a sprinkler nozzle or the like on the end thereof for distributing the water. As illustrated in FIG. 1, the truss bar has each drop hose 20 supported by a hose sling 21 which both guides and holds the hose 20 in place on the truss rod 17.

Figure 2:
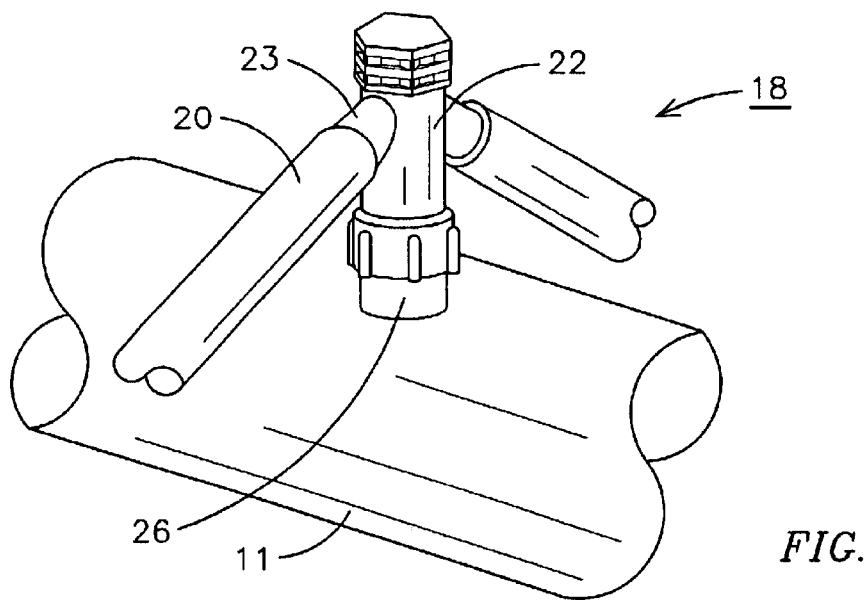
FIG. 2 is a perspective view of a section of the water main of the irrigation system of FIG. 1 having the hose coupling of the present invention.
Figure 4:
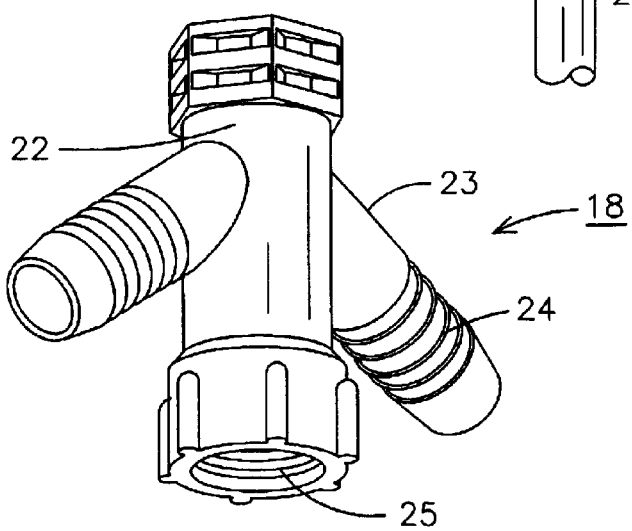
FIG. 4 is a perspective view of the water main hose coupling.

Turning to FIGS. 2 and 4, the water connector 18 connects to the water main 11 for connecting a pair of hoses 20 to the water main 11. The water coupling 18 has an upright body 22 with a pair of downwardly angled hose connecting portions 23 for connecting the hoses 20 at an angle to the upright body 22. The hoses 20 are mounted to the body 22 in a generally downward direction toward the truss rod 17. Each hose connector 23 has a plurality of serrations 24 for attaching the hose 20 thereover. The hose connector body 22 has a threaded base 25 for attaching to a threaded stub 26 for connecting to the water main 11.

Figure 3:
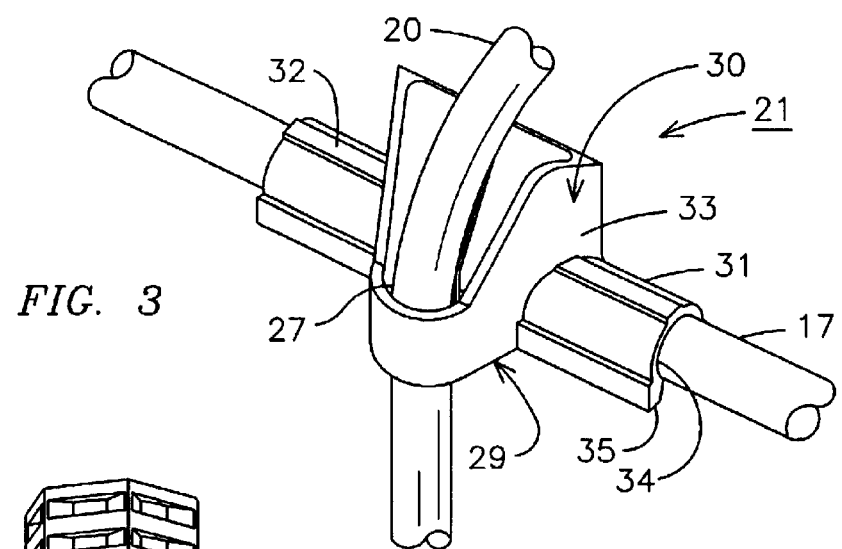
FIG. 3 is a perspective view of a section of a truss rod having a truss rod hose sling thereon.
Figure 5:
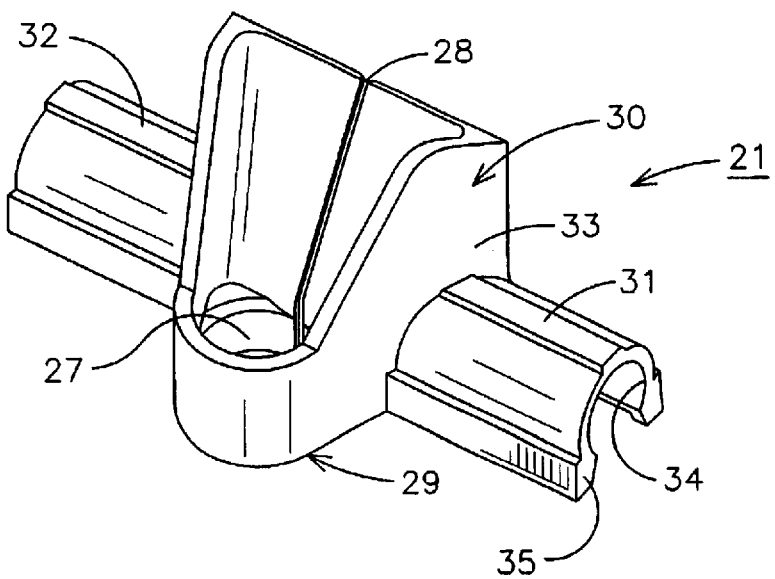
FIG. 5 is a perspective view of the truss rod hose sling.
Figure 6:
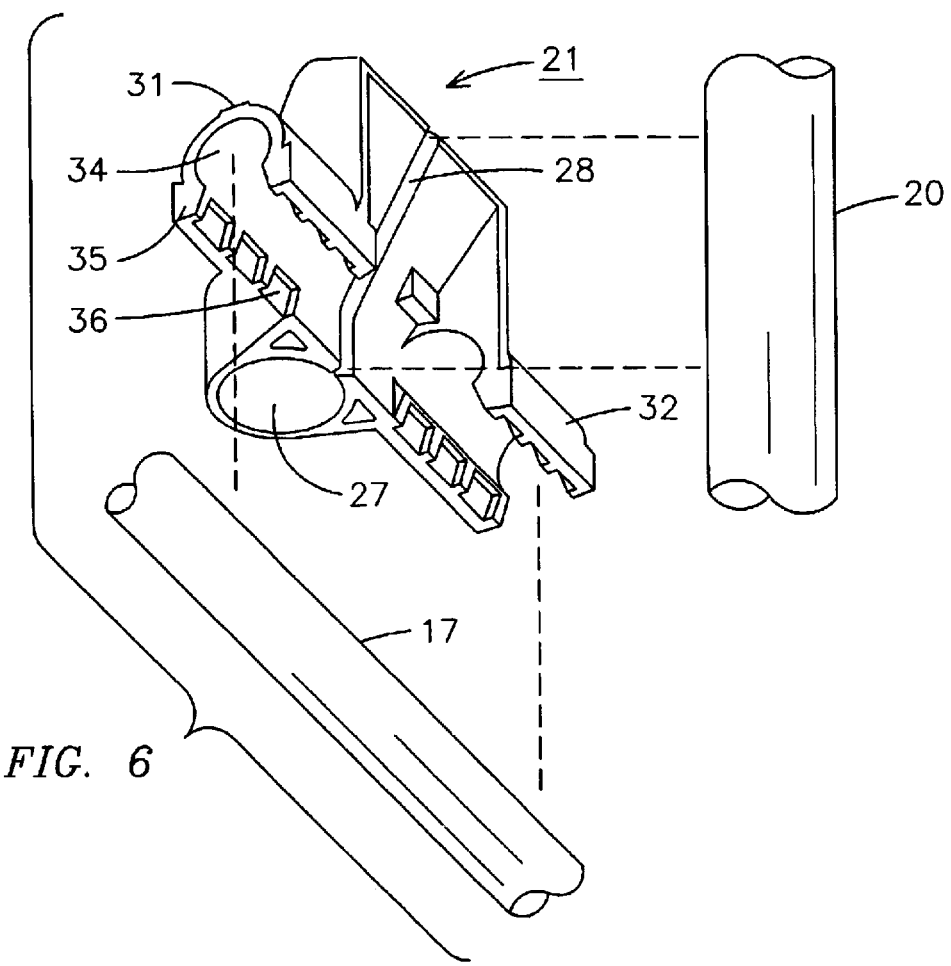
FIG. 6 is an exploded view of the truss rod hose sling of FIG. 5 with the hose and truss rod being coupled thereto.

FIGS. 3, 5 and 6 show the hose sling 21 for supporting a hose 20. Hose sling 21 has the hose sling or clamp portion 29 having an axial passageway 27 for holding the hose 20 therein and having a side opening 28 for inserting the hose 20 by twisting the body 29 to open up or spread the opening 28 for sliding the hose thereinto. The hose sling also has hose guides 30 for guiding the hose over the truss rod 17. A pair of truss rod clamps 31 and 32 extend from both sides of the sidewalls 33, one on each side of the opening 28. Each clamp 31 and 32 has an arcuate clamping portion 34 having a generally C-shape cross section with expanding lips 35 so that each clamp 31 and 32 can clip onto a truss rod, as shown in FIG. 3. Truss rod clamp portions 31 and 32 advantageously allow the hose sling 21 to be grabbed on each side to bend the body 29, which is made of a resilient polymer or other resilient material, to spread the opening 28 to allow the hose 20 to be slid in from the other side. The clamps 31 and 32 can then be clamped onto the truss rod 17, as shown in FIG. 3, to hold the hose sling 21 to the truss rod 17 and simultaneously preventing the opening 28 from being expanded while clamped to the truss rod 17 thereby locking the hose 20 within the clamp or sling 21.

As seen in FIG. 6, the hose 20 is first pushed through the opening 28 while spreading the opening 28 at which time the opening 28 is closed and the truss rod clamps 31 and 32 clamped to the truss rod. The truss rod clamps 31 and 32 may also have clamping teeth 36 thereon which may be of a made polymer material to allow the clamps to clip over the truss rod 17.

It should be clear at this time that a hose sling for an irrigation system has been provided which easily allows the sling to be clamped over a hose from the side of the hose and then clamped to a rod or pipe to hold the hose in place while locking the hose within the sling. However, it should also be clear that the present invention should not be limited to the forms shown which are to be considered illustrative rather than restrictive.

What is claimed is:

1. A wheeled line irrigation system comprising:

a water conduit supported on a plurality of towers having a truss built of a plurality of truss rods attached thereto to support a plurality of hoses connected to a water main over said trusses for distribution of irrigation water from said irrigation system;

a plurality of truss rod hose slings attached to one of said truss rod, each said truss rods hose sling having a body having a hose supporting clamp portion having an axial opening for holding one of said hoses therein and each said hose supporting clamp portion having a curved hose guide for one of said hoses to pass thereover to thereby guide said hose over one said truss rod, and said body having an expandable side opening for sliding one said hose into said axial opening; and a pair of truss rod clamps clamping each said truss rod hose sling to one said truss rod, whereby each said hose is clamped to one said truss rod to direct and guide the hose thereover.

2. The wheeled irrigation system in accordance with claim 1 in which each of said truss rod clamps is located on an opposite side of said hose supporting clamp portion expandable side opening to prevent said side opening from expanding to thereby hold said hose in said supporting clamp portion.

3. The wheeled irrigation system in accordance with claim 1 in which said water main has a plurality of water main connectors attached thereto for attaching a pair of water hoses thereto and each of said water main connectors has a pair of angled hose connections for connecting a water hose thereto.

* * * * *